No. 746,067. PATENTED DEC. 8, 1903.
G. W. GARY & B. O. OSTROM.
BEET DIGGER.
APPLICATION FILED JAN. 23, 1903.
NO MODEL.
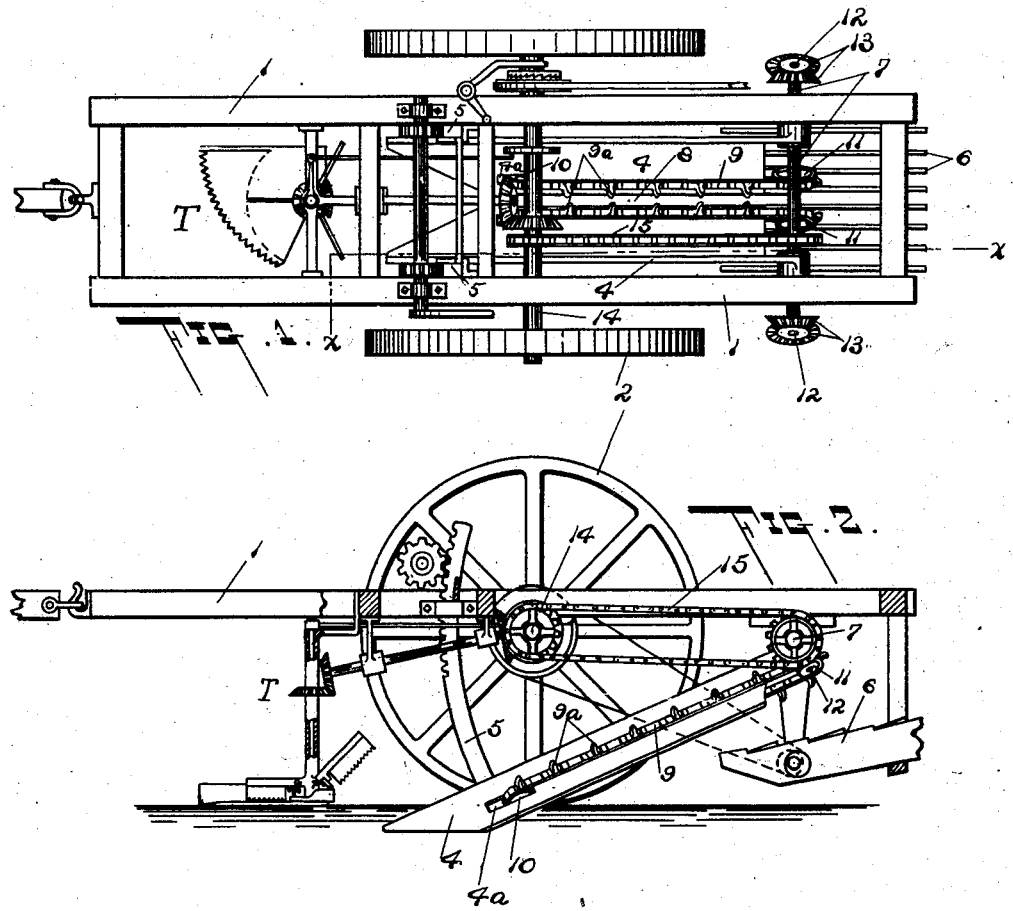
WITNESSES:
James C. Hanson.
P. M. Holdsworth.
George W. Gary.
Burton O. Ostrom.
INVENTORS
BY
Geo. B. Willcox. ATTORNEY No. 746,067. Patented December 8, 1903.

UNITED STATES PATENT OFFICE.

GEORGE W. GARY AND BURTON O. OSTROM, OF SAGINAW, MICHIGAN.

BEET-DIGGER.

SPECIFICATION forming part of Letters Patent No. 746,067, dated December 8, 1903.

Application filed January 23, 1903. Serial No. 140,277. (No model.)

*To all whom it may concern:*

Be it known that we, GEORGE W. GARY and BURTON O. OSTROM, citizens of the United States, residing at Saginaw, in the county of Saginaw and State of Michigan, have invented certain new and useful Improvements in Beet-Diggers; and we do hereby declare the following to be a full, clear, and exact description of the invention, such as will enable others skilled in the art to which it appertains to make and use the same.

This invention is a beet-digger.

The objects of the invention are to provide improved means for digging the beets from the ground and delivering them to the cleaners.

It is illustrated in the accompanying drawings, in which—

Figure 1 is a top plan view of a machine embodying our improvements, together with a topping mechanism not claimed in the present case; and Fig. 2 is a vertical section of the same with parts broken away and the left digging-blade removed, the section being taken on the line $x\,x$ of Fig. 1.

Our improved machine comprises a frame 1, mounted on wheels 2, which serve to carry the digging and lifting mechanism and also to drive the topping mechanism T.

The beets are taken from the ground by a pair of parallel digging-blades 4, inclined downwardly and inwardly toward each other at an angle of nearly forty-five degrees, whose forward ends are held by the racks 5 at the proper depth in the earth and whose rear ends are supported above the cleaning-bars 6 by a shaft 7, about which they may turn. A space 8 is left between the inner edges of the blades, through which escapes the greater part of the earth lifted with the beets, which are carried up to the cleaners by projecting fingers $9^a$ on elevating-chains 9. The chains 9 run parallel to the digging-blades 4, just clearing the upper surface in the ascent and returning beneath. At the bottom they run over guide-wheels 10, projecting up through slots $4^a$ in the blades 4. The chains 9 may be driven by any suitable means. We prefer to drive them by the wheels 11, fixed on shafts 12, driven by means of the bevel-gears 13 and the shaft 7, which receives its motion from the main shaft 14 by means of the chain 15. Although only one elevating-chain is shown for each digging-blade, two chains may be used for each, if needed.

By the means described we have produced a beet-harvester which as it is drawn along a row of beets automatically lifts the beets from the ground and elevates them to the cleaners, separating them from the loose earth as they are carried upward.

What we claim as our invention, and desire to secure by Letters Patent, is as follows:

1. In a beet-harvester having a supporting-frame and a pair of driving-wheels adapted to carry the frame; a pair of upwardly and backwardly inclined digging-blades, the faces of said blades being inwardly and downwardly inclined toward each other; an elevating-chain for each digging-blade said chains being adapted to travel upwardly near the upper surface of the blades, and downwardly beneath, and having upwardly and inwardly projecting fingers; and means for driving said chains from the driving-wheels.

2. In a beet-harvester, a digging and elevating mechanism comprising a pair of upwardly and backwardly inclined digging-blades, having their faces inclined toward each other but not meeting; an elevating-chain for each blade traveling upwardly near the upper surface of the blade and downwardly beneath the blade, said chains having fingers which project upwardly and inwardly toward the opposite side of the machine in the ascent, and means for driving the chains, all substantially as described.

In testimony whereof we affix our signatures in presence of two witnesses.

GEORGE W. GARY.
BURTON O. OSTROM.

Witnesses:
P. M. HOLDSWORTH,
A. A. EASTERLY.